United States Patent
Hansen et al.

(10) Patent No.: US 11,156,207 B2
(45) Date of Patent: Oct. 26, 2021

(54) OPERATION OF A WIND TURBINE DURING GRID LOSS USING A POWER STORAGE UNIT

(71) Applicant: MHI VESTAS OFFSHORE WIND A/S, Aarhus N (DK)

(72) Inventors: Torben Møller Hansen, Hornslet (DK); Niels Erik Danielsen, Brabrand (DK); Tusitha Abeyasekera, Århus N (DK); Lars Helle, Suldrup (DK); Ghada Ali Diaa Hillawi, Aarhus C (DK); Laurids Givskov Jørgensen, Århus C (DK); Paw Rosenvard, Gjern (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/619,723

(22) PCT Filed: Jun. 8, 2018

(86) PCT No.: PCT/DK2018/050128
§ 371 (c)(1),
(2) Date: Dec. 5, 2019

(87) PCT Pub. No.: WO2018/224110
PCT Pub. Date: Dec. 13, 2018

(65) Prior Publication Data
US 2020/0166017 A1 May 28, 2020

(30) Foreign Application Priority Data
Jun. 8, 2017 (DK) .............................. PA201770446

(51) Int. Cl.
*F03D 9/00* (2016.01)
*H02P 9/04* (2006.01)
(Continued)

(52) U.S. Cl.
CPC ......... *F03D 7/0264* (2013.01); *F03D 7/0224* (2013.01); *F03D 7/0276* (2013.01);
(Continued)

(58) Field of Classification Search
CPC .......... F03D 9/11; F03D 9/255; F03D 7/0264; F03D 7/0224; F03D 7/0276; F05B 2270/1071; F05B 2270/337
See application file for complete search history.

(56) References Cited

U.S. PATENT DOCUMENTS 7,466,109 B1 * 12/2008 Larsen .................... H02P 9/007
322/59
2007/0267873 A1 * 11/2007 Teichmann ........... F03D 7/0224
290/44

(Continued)

FOREIGN PATENT DOCUMENTS

CN 101228351 A 7/2008
CN 101629553 A 1/2010

(Continued)

OTHER PUBLICATIONS

PCT International Search Report for Application No. PCT/DK2018/050128 dated Sep. 13, 2018.
(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

The present invention relates to operation of a wind turbine using a power storage unit, such as a rechargeable battery, to power a group of power consuming units during grid loss. The wind turbine comprises a number of power consuming units being grouped into at least a first group and a second group, a first electrical converter for connecting the genera-
(Continued)

tor to the electrical grid, and a second electrical converter for connecting the electrical generator to the power storage unit. Upon detecting an occurrence of the grid loss, the generator is operated to ensure sufficient power of the power storage unit to operate the first group of power consuming units.

23 Claims, 3 Drawing Sheets

(51) Int. Cl.
      *F03D 7/02* (2006.01)
      *F03D 9/11* (2016.01)
      *F03D 9/25* (2016.01)

(52) U.S. Cl.
      CPC ............... *F03D 9/11* (2016.05); *F03D 9/255* (2017.02); *F05B 2270/1071* (2013.01); *F05B 2270/337* (2013.01)

(56) References Cited

U.S. PATENT DOCUMENTS

| | | | |
|---|---|---|---|
| 2008/0054641 A1 | 3/2008 | Voss | |
| 2008/0111380 A1 | 5/2008 | Delmerico et al. | |
| 2009/0278352 A1* | 11/2009 | Rivas | F03D 9/255 290/44 |
| 2011/0025059 A1* | 2/2011 | Helle | F03D 9/10 290/44 |
| 2011/0168495 A1 | 7/2011 | Subramaniam et al. | |
| 2011/0291416 A1 | 12/2011 | Edenfeld | |
| 2013/0175801 A1 | 7/2013 | Matzen | |
| 2014/0225369 A1 | 8/2014 | Bodewes | |
| 2014/0291990 A1 | 10/2014 | Sala Llum et al. | |
| 2015/0123402 A1 | 5/2015 | Wagoner et al. | |
| 2015/0256030 A1 | 9/2015 | Schult et al. | |
| 2018/0123470 A1* | 5/2018 | Nielsen | H02M 7/493 |

FOREIGN PATENT DOCUMENTS

| | | |
|---|---|---|
| CN | 101672252 A | 3/2010 |
| CN | 104471242 A | 3/2015 |
| DE | 102009017244 A1 | 10/2010 |
| EP | 2211055 A1 | 7/2010 |
| WO | 2018224110 A1 | 12/2018 |

OTHER PUBLICATIONS

PCT Written Opinion of the International Searching Authority for Application No. PCT/DK2018/050128 dated Sep. 13, 2018.

Chinese Office Action for Application No. 201880050075.7 dated Sep. 27, 2020.

Taiwanese Office Action and Search Report for Application No. 107119857 dated Aug. 23, 2021.

* cited by examiner

OPERATION OF A WIND TURBINE DURING GRID LOSS USING A POWER STORAGE UNIT

FIELD OF THE INVENTION

The present invention relates to operation of a wind turbine using a power storage to power a group of power consuming units during grid loss.

BACKGROUND OF THE INVENTION

A wind power plant, also referred to as a wind park, typically includes several wind turbines, the generating outputs of which are networked to supply power to the national or regional utility grid electrical system (or simply the grid). A wind turbine includes complicated electrical systems including numerous control units, switching equipment, cooling systems, lighting systems, actuators and hydraulic systems which require their own dedicated power supply. This power supply is itself fed from the grid electrical system via a transformer sub-station that forms part of the wind turbine facility. Such a power supply may be termed an 'internal power supply grid', and its role is to manage and distribute a medium voltage power supply to the wind turbines and auxiliary equipment in the form of power consuming units within the wind power plant to ensure high availability of power generation.

In the event of a so-called grid loss where the wind turbine loses connectivity to the grid, the electrical systems of the wind turbines also loses its power. In order to mitigate problems arising from such power loss, it is known to equip the wind power plant with a form of auxiliary power supply. This may take the form of a battery-based system or may be based on a diesel generator. For example, US2013/0175801 describes a system in which a diesel generator is used as a backup power supply in an offshore wind farm.

A backup supply system may ensure that at some elements of the turbines of the wind power plant remain operational even during a grid power disruption. US 2011/0291416 describes a wind turbine system where an energy storage is charged during grid loss from a DC link of the main converter bridging the generator and the electrical grid. This requires operating the main converter during grid loss.

It is against this background that the invention has been devised.

SUMMARY OF THE INVENTION

It would be advantageous to achieve a wind turbine which in a grid loss situation is capable of utilizing the wind to power at least a group of power consuming units to ensure a certain level of functionality during the grid loss.

Accordingly, in a first aspect, there is provided a method of operating a wind turbine during a grid loss, the wind turbine comprising a rotor with a number of pitch-adjustable rotor blades, the rotor being arranged to drive an electrical generator, the wind turbine further comprises:
  a power storage unit;
  a number of power consuming units being grouped into at least a first group of power consuming units and a second group of power consuming units, the first group of power consuming units being powered by the power storage unit; and
  a first electrical converter for connecting the generator to the electrical grid; and a second electrical converter for connecting the electrical generator to the power storage unit;

the method further comprises:
  detecting an occurrence of the grid loss, and
  in occurrence of the grid loss, disconnecting the first electrical converter from the electrical generator, and connecting the second electrical converter to the electrical generator,
wherein the electrical generator is operated with a reduced rotation speed.

By ensuring sufficient power to operate a group of power consuming units, important or critical power consuming units can be kept operating during grid loss. By basing the powering on a dedicated second electrical converter which is capable of converting energy of the generator during the grid loss, operation of the turbine can be ensured even for prolonged grid losses. The first and second group of power consuming units may also be referred to as a first and second group of auxiliary units, or first and second auxiliary systems.

It is an advantage to disconnecting the first electrical converter, the main converter, in case of grid loss, and connecting instead the second electrical converter, an auxiliary converter, since the auxiliary converter can be dimensioned with components for handling significantly less power ratings, and thereby the need for generating electric energy is less since energy for powering the main converter is not required. In this manner, in a situation of operation without recharging the storage unit, the turbine will be able to endure a longer period without wind since there is no need for powering the main converter.

Additionally, by use of an auxiliary converter for powering the first group of power consuming units/the power storage unit, the main converter can be tailored for connectivity to the grid, and no modifications is needed in view of powering the first group of power consuming units/the power storage unit. Therefore, embodiments of the present invention also support easy retrofit of existing turbines, since no changes to an existing main converter is needed.

The power storage unit may be a battery, a super-cap type storage unit, or other power storage units. Such power storage units will have a limited capacity and advantageous only relevant power consuming units should be powered during the grid loss, to reduce the power drain on the power storage unit. The first group of power consuming units can be selected to comprise at least one of: pitch actuators, equipment for lubrication of gearbox and/or bearings, yaw actuators, and a control unit. More or less power consuming units may be included in the first group of power consuming units depending on turbine design, power storage capacity. For example the first group of power consuming units may also include selected dehumidifiers and selected heaters. The selected first group of power consuming units may also be interchanged during the grid loss, depending on e.g. voltage level, sensor readings, duration of grid loss, or other factors. Moreover, various sensors may also be included in the first group of power consuming units, such as rotor speed sensor, wind speed sensor, grid sensor. The wind speed may also be obtained as an estimated wind speed determined by an estimator implemented in the control unit.

During grid loss, the generator may be operated at reduced speed to ensure sufficient power of the power storage unit to operate the first group of power consuming units. Operation of the generator at reduced speed may include reducing the generator speed to stop, as well as operating the generator at a low rotor speed, for example by operating the turbine in idling mode, where the rotor is allowed to slowly rotate. In an embodiment, the second electrical converter is connected to the generator at a time when the rotation of the generator is reducing to stop. In this regard, a stop may be a full stop, but may also include slight movement of the rotor at such a low level that no, or substantially no, power is generated at the generator terminals. Operating the generator at reduced speed include setting the speed of the slowly revolving generator to a speed which is sufficient for the second electrical converter to provide a given power level for powering the first group of power consuming units. Such power level may be obtained with one or more time periods where the rotor is stopped and one or more time periods where the rotor is operated at low rotational speed (idling). The idling operating turbine may thereby provide a backup power supply to the critical components of the wind turbine. Operating the turbine at a low rotor speed may be referred to as operating the turbine in self-powering operational mode. In an embodiment, the generator is operated to be rotating a speed which is lower than a rotor speed threshold. The rotor speed threshold been lower than rated speed, such as 50%, 25%, 10%, 5% or other appropriate speed threshold. Thus the generator may be operated at a reduced rotational speed, such as below 50%, 25%, 10%, 5% or other appropriate speed below rated rotor speed.

In embodiments, the second group of power consuming units are not powered during the grid loss.

The first and second group of power consuming units may be either DC connected units or AC connected units. In embodiments, the first and second group of power consuming units may be connected on separate internal power supply grids. Thus the first group of power consuming units may be connected to a first internal power supply grid and the second group of power consuming units may be connected to a second internal power supply grid. In an embodiment the first group of power consuming units may be DC connected units connected to an internal DC power supply grid, whereas the second group of power consuming units may be AC connected units connected to an internal AC power supply grid.

The first electrical converter is the 'normal' converter for connecting the generator to the electrical grid, the first electrical converter may be a frequency converter, such as a full-scale converter. The second electrical converter is in an embodiment a separate dedicated converter connecting the generator to the power storage unit. In embodiments, the second electrical converter is selective connected to the electrical generator upon detection of the occurrence of the grid loss. In addition to this, the first converter may be selective disconnected during grid loss.

The electrical generator may be any type of generator, however it may be advantageous to use a permanent magnet based generator, as these do not require electrical field inducing currents to be generated during the grid loss.

The power storage unit may be an electrical power storage unit. In an embodiment, the power storage unit is a rechargeable power storing unit. The selective connection of the second electrical convertor to the electrical generator may further be conditioned upon detection of the voltage level of the rechargeable power storing unit is below a first voltage threshold. In this manner, power may be drawn from the power storage unit for as long as the power level of the power storage unit is sufficiently high, and only upon the voltage level being below a threshold is the power storage unit recharged.

In embodiments, the power capacity of the power storage unit is in the range of 1 to 100 kWh, such as between 50 and 80 kWh. The specific capacity is based on the specific turbine design, The selective connection of the second electrical convertor to the electrical generator may further be conditioned upon detection of the output voltage level of the electrical generator. In an embodiment, the second electrical convertor to the electrical generator is disconnected from the electrical generator upon detection of an output voltage level of the electrical generator is below a first output threshold and connected to the electrical generator upon detection of an output voltage level of the electrical generator is above a second output threshold, the second output threshold being larger than the first output threshold. While the second electrical converter is connected to the electrical generator, the rotor is slowed down due to the imposed torque from the electrical load. When the output voltage is below a certain threshold there may be a risk that the imposed torque will slow the generator too much. Upon detection of the output voltage is increased above the second output threshold, the second electrical converter may be connected again. By ensuring the second electrical converter is not connected until the output voltage is above the second output threshold being larger than the first output threshold, a hysteresis is imposed ensuring that the second electrical converter is not switching in and out constantly.

The electrical generator is driven by the rotor, and the rotational speed of the generator (generator speed) is therefore influenced by the wind speed. By adjusting the pitch of the rotor blades, the generator speed can be controlled. To achieve this a closed loop speed controlled may be implemented in the control unit. The closed loop speed controller being implemented to adjust the pitch of the rotor blades in order to achieve a setpoint rotor speed, e.g. by use of a PID, PI or similar type of controller. Thus during grid loss the generator speed may be controlled by adjusting the pitch-adjustable rotor blades.

In an embodiment, the generator speed is controlled to be within a speed range. By controlling the generator speed to be within a range, rather than a specific setpoint, the pitch activity may be reduced.

In embodiments, the control may also be based upon a wind speed detection or wind speed estimation, where a pitch angle is set in dependency upon the wind speed. This may e.g. be done by use of a look-up table in a feed forward controller, where the wind speed is detected and the pitch angle set accordingly.

In embodiments, the rotor speed is controlled to be between 5% and 25% of the rated rotor speed, such as between 10% and 15% of the rated rotor speed. The rotor speed may be controlled to be within a specified range centred around at a given setpoint value, such as to be within 10%±5%. In general, the rotor speed may be control by a setpoint value or by a setpoint range within these mentioned speed ranges. A specific target rotor speed (range) may depend upon the turbine design, including the design of the second electrical converter. In embodiment, with such a rotor speed, and output power of the generator may be between 50 V AC and 100 V AC.

The reduced power output from the generator may be boosted by the second electrical convertor to a suitable input level for the power storage unit. Such input level may be in the range of 300 V AC to 600 V AC, including 400 V AC.

In embodiments, the second electrical converter may be a frequency converter, such as an AC/AC boost converter, is arranged to provide a constant voltage and frequency AC output from a variable voltage and frequency input. The frequency input may typically be between 5 Hz and 15 Hz, such as 10 Hz.

The second electrical converter may in embodiments be connected to a single 3-phase winding of the generator.

In an embodiment, the pitch-adjustable rotor blades during grid loss, are operated in a reduced mode with slower pitch angle adjustment as compared to normal mode operation.

By operating the pitch-adjustable rotor blades in a reduced mode, the power consumption needed to operate the pitch may also be reduced. For a hydraulic pitch system, the reduced mode may be a mode where the hydraulic system is reduced to only pressurize a part of the hydraulic system as well as a mode where spillage is reduced. For an electrical pitch system, the reduced mode may be a mode where the voltage level is lower than the normal voltage level of the pitch actuator, or a mode where certain electrical loads are switched off.

In an embodiment, the hydraulic system comprises one or more check valves which can be selectively closed. The check valves may be operated to be selectively closed during periods where the pitch is not adjusted and selectively opened during periods where the pitch is adjusted. When the check valves are closed, the hydraulic pumps may be turned off.

By closing selected check valves the spillage of the hydraulic system may be removed or limited. During operation of the pitch actuators a certain spillage may be needed, and the controllable check valves may be opened to ensure normal operation of the hydraulic system.

Controlled check valves may also be used to close off parts of the hydraulic system during grid loss.

Since the requirement to operate the electrical generator may merely be to operate it at an approximate rotational speed, slow pitch adjustment may be sufficient.

In an embodiment, upon detection of the voltage level of the rechargeable power storing unit being below a second voltage threshold, the rotation of the rotor and a sleep mode of the control unit is entered.

In an embodiment, while in sleep mode, the wind speed may be detected at fixed time intervals where the wind turbine controller is programmed to wake up, possibly in a partly low power consuming mode, to evaluate whether or not idle mode operation or normal mode operation can be supported.

The time interval may be a fixed pre-programmed time interval. However, in embodiments, the time interval may be based on weather forecast information obtained from the SCADA system prior to entering the sleep mode. By basing the time interval on a weather forecast, unnecessary energy drain from the power storage unit may be avoided. The weather forecast information obtained from the SCADA system may also be used to set appropriate thresholds for the voltage levels.

In an embodiment, upon the detection of the occurrence of the grid loss, the rotation of the rotor is stopped and while the voltage level of the power storage unit is above the first threshold, the first group of power consuming units is powered by the power storage unit. Thus, the power storage unit functions as a normal power backup. Upon detecting that the voltage level of the power storage unit is below the first voltage threshold, self-powering operation is initiated, where the generator is operated to ensure sufficient power of the power storage unit to operate the first group of power consuming units.

Once the grid is restored, the turbine returns to normal mode operation.

In an embodiment, the electrical generator is operated in an idling mode of operation with a reduced rotation speed. Still, in such idling mode, the second electrical converter can deliver power to the energy storage unit, and e.g. also to power the second group of power consuming units.

Especially, the first and second electrical converters can be connected to the electrical generator by means of controllable switches, wherein the method may comprise operating the controllable switches to selectively connect the first or second electrical converters to the electrical generator.

The second electrical converter may be implemented in various ways and being arranged to generate a DC electrical output and/or an AC electrical output, e.g. at a grid level voltage. Especially, the second electrical converter may be arranged to generate both a DC electrical output and an AC electrical output. Specifically, the second electrical converter may be arranged to generate AC electrical power for powering the second group of power consuming units.

Specifically, the second electrical converter may comprise an AC boosting circuit, and/or a DC boosting circuit. In a specific embodiment, the second electrical converter comprises a rectifying circuit followed by a DC to DC boosting circuit.

Preferably, the first electrical converter, the main converter, is dimensioned to handle a rated power of the wind turbine, whereas the second electrical converter is dimensioned to handle less than 10%, such as less than 1%, of the rated power of the wind turbine. Thus, the second electrical converter can be implemented with less expensive and more efficient components, due to the limited power handling required.

It may be preferred that the electrical generator is a permanent magnet electrical generator, since such generator can still generate power for capturing by the second electrical converter in an idling mode of operation, without electrical grid connection, especially in embodiment with the second electrical converter comprising an AC and/or DC boosting circuit.

In a further aspect, the invention relates to a computer program product. This may be provided on a computer readable storage medium or being downloadable from a communication network. The computer program product comprises instructions to cause a data processing system, e.g. in the form of a controller, to carry out the instruction when loaded onto a data processing system.

In general, a controller may be a unit or collection of functional units which comprises one or more processors, input/output interface(s) and a memory capable of storing instructions can be executed by a processor.

In a further aspect, the invention relates to a wind turbine comprising:
  an electrical generator;
  a rotor with a number of pitch-adjustable rotor blades, the rotor being arranged to drive the electrical generator;
  a power storage unit;
  a number of power consuming units being grouped into at least a first group of power consuming units and a second group of power consuming units, the first group of power consuming units being powered by the power storage unit;
  a first electrical converter for connecting the generator to the electrical grid;
  a second electrical converter for connecting the electrical generator to the power storage unit;
  a grid sensor for detecting the electrical state of the electrical grid;
  a data processing system arranged to detecting an occurrence of a grid loss, and upon detection of the occurrence of the grid loss, disconnecting the first electrical converter from the electrical generator, connecting the second electrical converter to the electrical generator, and operating the electrical generator with a reduced rotation speed.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 1 schematically illustrates an embodiment of elements of a wind turbine together with example elements inside a nacelle housing.

DESCRIPTION OF EMBODIMENTS

Figure 1:
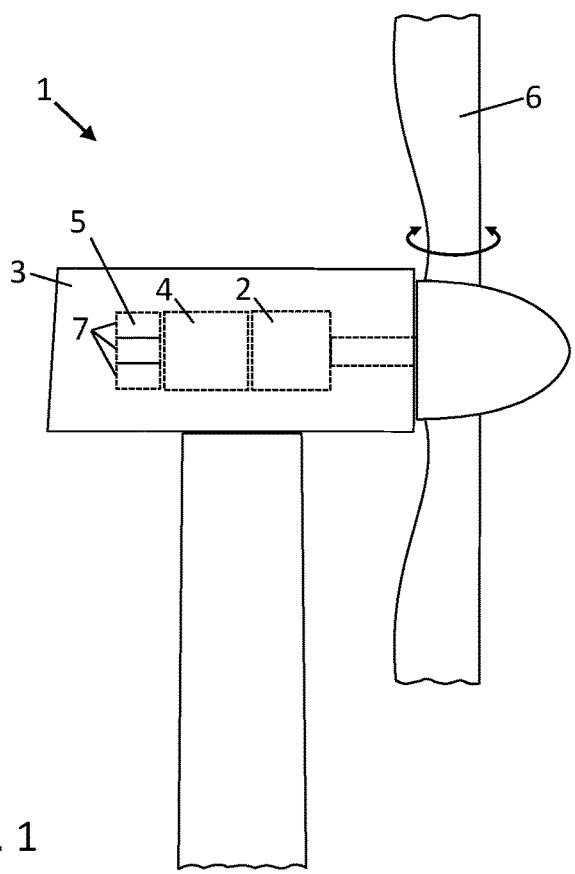

FIG. 1 schematically illustrates an embodiment of elements of a wind turbine 1 together with example elements inside a nacelle housing 3. The wind turbine comprises pitch-adjustable rotor blades 6 which are mechanically connected to drive an electrical generator 2. The electrical generator 2 is connected to electrical components 4, including the first and second electrical converters. Also a number of power consuming units 7 are schematically illustrated. While not shown, the wind turbine may optionally comprise a gearbox, as well as further electrical and mechanical components.

One of the power consuming units is the control unit 5. The control unit may further comprise a number of elements, including at least one central controller with a processor and a memory, so that the processor is capable of executing computing tasks based on instructions stored in the memory. While the control unit is illustrated as a single entity, it may in embodiments be distributed both in location and in function. In normal operation, the wind turbine controller ensures that the wind turbine generates a requested power output level. This is obtained by adjusting the pitch angle and/or the power extraction of the (first) converter.

Figure 2:
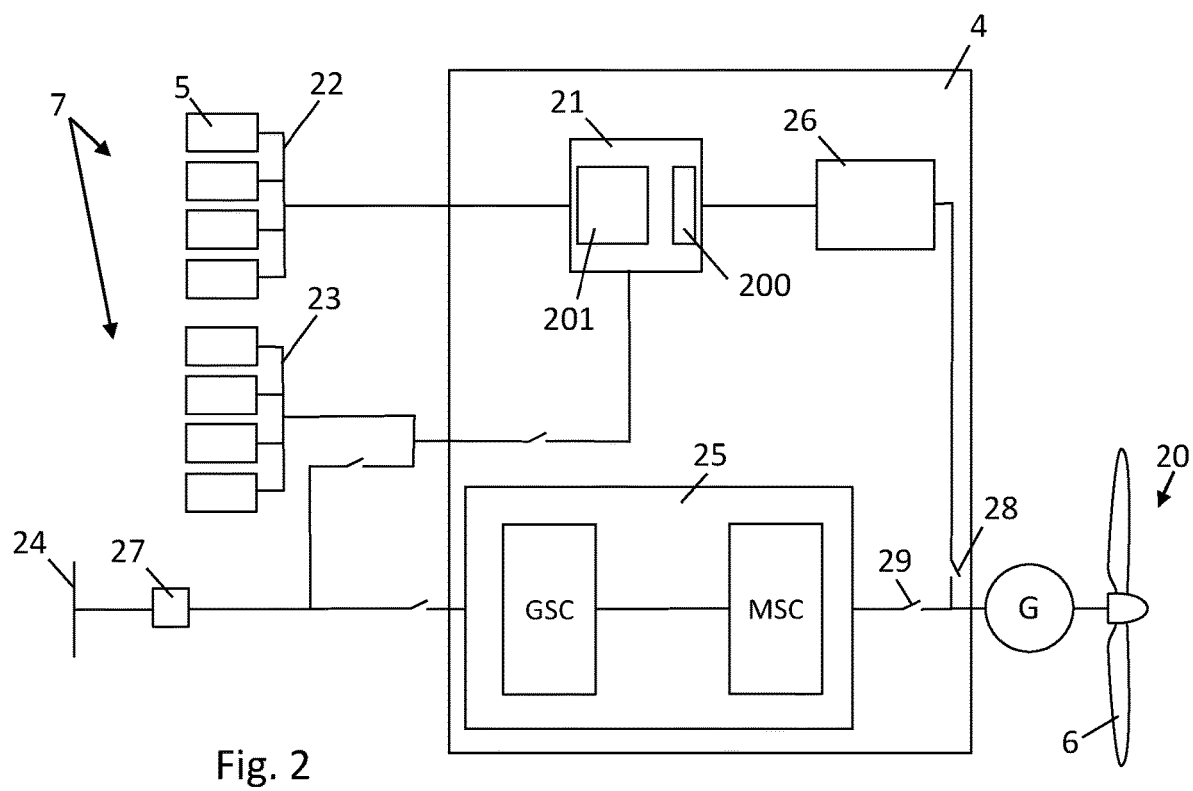
FIG. 2 schematically illustrates elements of an embodiment of the present invention, including an embodiment comprising the second electrical converter.

FIG. 2 schematically illustrates elements of an embodiment of the present invention.

The figure illustrates a rotor 20 with a number of pitch-adjustable rotor blades 6, the rotor being arranged to drive an electrical generator G. The wind turbine further comprises a power storage unit 21, a number of power consuming units 7 being grouped into at least a first group 22 of power consuming units and a second group 23 of power consuming units. The first group of power consuming units being powered by the power storage unit 21. In the illustrated embodiment, the second group being powered by the electrical grid 24. The electrical components 4 includes a first electrical converter 25 for connecting the generator G to the electrical grid 24. Such electrical converter typically comprises a machine side converter MSC and a grid side converter GSC connected by a DC link. In addition to the first electrical converter, also a second electrical converter 26 is illustrated. The second electrical converter 26 connecting the electrical generator G to the power storage unit 21.

FIG. 2 further illustrates a grid detector 27 which is capable of detecting the state of the grid. The control unit 5 is implemented, upon detection of an occurrence of a grid loss, to instruct the generator to operate to ensure sufficient power of the power storage unit to operate the first group of power consuming units.

In addition to the control unit 5, the first group 22 of power consuming units may further include pitch actuators, equipment for lubrication of bearings, yaw actuators, selected dehumidifiers and selected heaters, selected hydraulic pumps, controllable check valves.

The second group 23 of power consuming units may comprise such units as power supplies for lifts, lights, cooling, heating, ventilation, hydraulic pumps, etc.

The power storage unit 21 typically outputs DC power, and the first group of power consuming units are typically DC powered units, whereas the second group of power consuming units may be AC powered units. At least in the illustrated embodiment, where the second group of power consuming units are grid connected, via appropriate transformer equipment (not shown). The power storage unit may thus comprise an AC input and a DC output. The power storage unit may be a rechargeable battery, where the AC input is an input to a battery charger 200. The power storage unit may comprise a number of rechargeable battery cells 201.

In the illustrated embodiment, upon grid loss, the first group of power consuming units are powered by the power storage unit, whereas the second group of power consuming units are not powered.

In the illustrated embodiment, the second electrical converter is connected to the electrical generator via a switch 28, so that the second electrical converter can be selective connected to the electrical generator upon detection of the occurrence of the grid loss. Depending upon the type of generator and/or converter, it may be advantageous to be able to selective disconnected the first electrical converter during the grid loss. This may be done by switch 29.

The second electrical converter may be an AC/AC boost converter which is arranged to provide a constant voltage and frequency AC output from a variable voltage and frequency input. The AC/AC boost converter may e.g. be arranged to convert a 64 V AC input at 10 Hz from the rotating generator at reduced speed, to a 400 V AC output suitable for the power storage unit. In this regard, the AC/AC boost converter may be arranged to accept a certain input range both in voltage and in frequency.

The illustrated power storage unit is a rechargeable power storing unit, in which case the output of the second electrical converter 26 is used for recharging the power storage unit, which is drained from the powering of the first group of power consuming units.

In an embodiment, the selective connection of the second electrical convertor to the electrical generator is further conditioned upon detection of the voltage level of the rechargeable power storing unit is below a first voltage threshold. The charging of the power storage unit may be obtained by trickle charging.

In an embodiment, the output voltage level of the electrical generator is monitored to ensure that the second electrical converter is only connected to the generator if the generator output is above a certain level.

During normal operation, i.e. when the grid is present, the second electrical converter 26 is disconnected and the power storage 21 is charged via the grid. In this regard the two switches between the grid 24 and the power storage 21 is connected. Moreover, further electrical equipment may be inserted between the grid and the power storage in order to enable such charging. Such further equipment is not shown, but it is with the skilled person's ability to select appropriate equipment.

Figure 3:
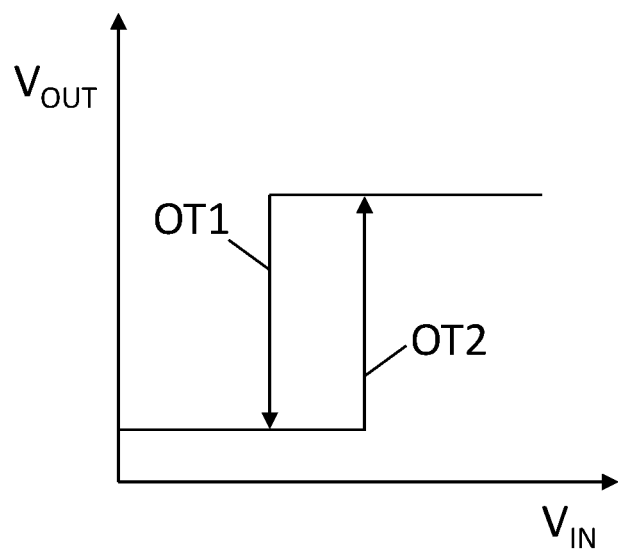
FIG. 3 illustrates an example of the operation cycle of the second electrical converter.

FIG. 3 illustrates an example of the operation cycle of the second electrical converter, which shows that the second electrical convertor is disconnected for an output voltage level of the electrical generator below a first output threshold OT1 and connected for an output voltage level of the electrical generator being above a second threshold OT2.

Figure 4:
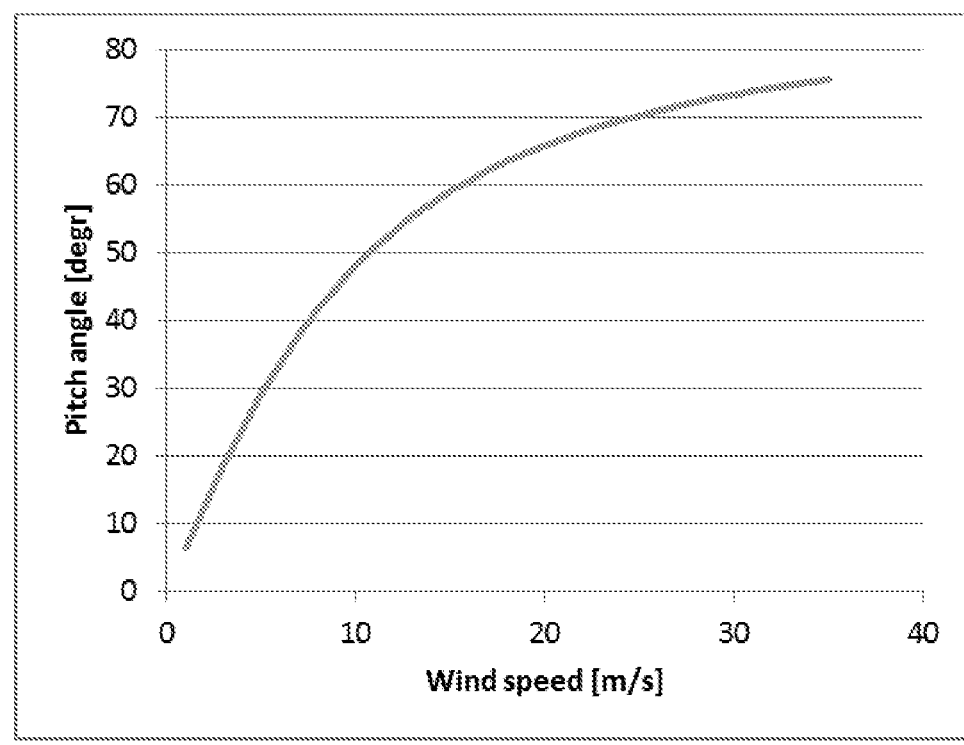
FIG. 4 illustrates an example of pitch angle settings in dependency upon the wind speed.

During grid loss the generator speed is controlled by adjusting the pitch-adjustable rotor blades. An example of pitch angle settings in dependency upon the wind speed is illustrated in FIG. 4.

In one embodiment, the wind speed is measured or estimated when the self-powering mode is initiated. Here the initial pitch angle is set according to a predefined pitch angle, such as illustrated on FIG. 4. As the grid loss continues, the pitch angle may be controlled via speed control of the generator, either to ensure that the speed remains either at an appropriate level, or within an appropriate range. Typically approximately around 10% of nominal rotor speed. The graph illustrated in FIG. 4, may typically be implemented as a look-up table in the control unit. In an alternative embodiment, the rotor speed is not monitored. Instead the pitch angle is set in accordance with the wind speed. If the second electrical converter can accept a large variation in speed and frequency, there may not be a need for a speed control of the generator.

Embodiments of the present invention allows for keeping the first group of power consuming units operational even in high wind situations. Above a certain wind speed there may be a need for shutting down the turbine, however the time period where the wind is so high that the rotor needs to be completely stopped is normally less that the time where the power storage unit can support operation of the first group of power consuming units.

Figure 5:
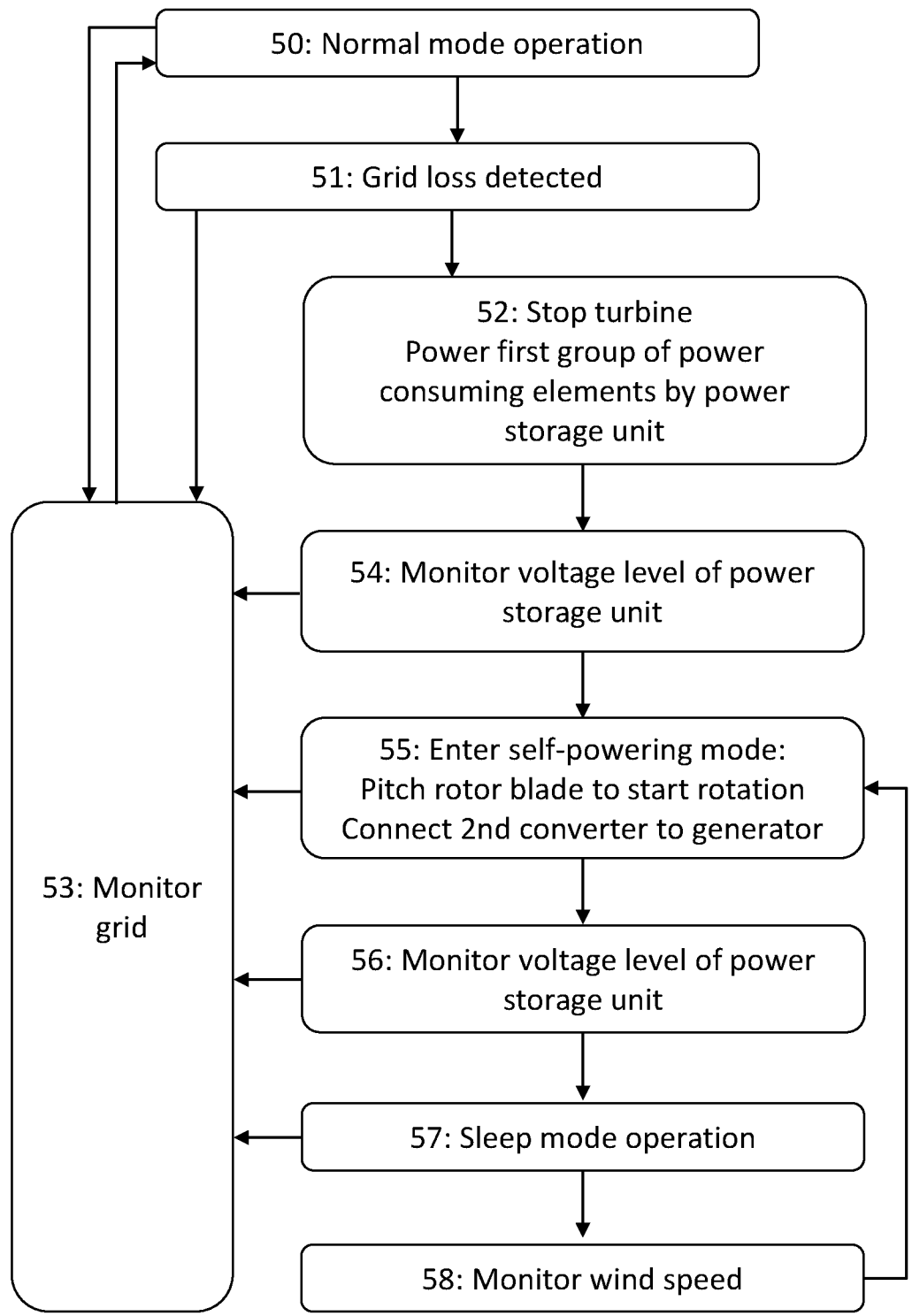
FIG. 5 illustrates a flow chart of operation of a wind turbine in accordance with embodiments of the present invention.

FIG. 5 illustrates a flow chart of operation of a wind turbine in accordance with embodiments of the present invention.

In normal mode operation 50 the grid is monitored, and upon detection of a grid loss 51, e.g. using a grid detector 27, the turbine rotor is initially stopped 52, this is done by feathering the rotor blades, i.e. turning the blades to their feathering position typically around 90 degrees. When the turbine is stopped the voltage level of the power storage unit 21 is normally at nominal level allowing for powering of the first group of power consuming elements, typically, for a number of hours. While in off grid situation, the grid is continuously monitored 53 so that normal operation can be resumed upon grid availability. At the same time, also the voltage level of the power storage unit is monitored 54. While the voltage level of the power storage unit is above the first voltage threshold, the turbine remains stopped and the first group of power consuming units remains powered by the power storage unit. Upon detecting that the voltage level of the power storage unit gets below the first voltage threshold, self-powering mode is entered 55 operating the generator at reduced speed to ensure sufficient power of the power storage unit to operate the first group of power consuming units.

For as long as the energy in the wind is sufficient to trickle charge the power storage unit, the self-powering mode can be maintained. The wind speed need not constantly be above a certain level, however, at least periods of sufficient wind need to be present to keep the voltage level of the power storage unit above a minimum threshold, the second voltage threshold.

Upon detection of the voltage level of the rechargeable power storing unit gets below the second voltage threshold, the rotation of the rotor is stopped, and sleep mode of the turbine is entered.

In sleep mode operation 57, in an embodiment, in addition to stopping the rotor, the first group of power consuming units, or at least a sub-group of the first group of power consuming units, are disconnected from the power storage unit, and only a wake-up circuit is powered. The wake-up circuit may be a simple timer circuit which at set time intervals wake up the control unit 5, or parts of the control unit 5, to detect the wind speed and compare the wind speed with a wind speed threshold, upon detection of the wind speed being above a second wind speed threshold, the sleep mode may be ended. In an alternative embodiment, the wind speed may also be monitored continually during sleep mode, and upon detecting the wind speed is sufficient high, the self-powering mode is re-entered. The wake-up circuit may be set to ensure that the wind speed has been above the wind speed threshold for a prolonged period of time, to ensure that the wind speed is stable.

If the grid is restored, the normal mode is resumed, whereas if the grid is still not functioning, self-powering mode is entered.

In an embodiment, as an alternative to a wake-up circuit, the turbine may also arranged for manual restart, e.g. via the SCADA system.

In an embodiment, steps 52, 54 may be omitted so that the turbine upon detection of grid loss enters the self-power mode 55 directly.

In embodiments, the discharge rate of the power storage unit may be monitored, e.g. by a monitoring module of the control system or via a data connection to a SCADA system. In the event of a rapid discharge of the energy storage device service personnel may be informed for mobile recharging. In general, the status of the charge level of the power storage unit may be communicated, e.g. via SCADA, to service personnel during idle mode to ensure that the service personal can react to a problematic situation.

Example embodiments of the invention have been described for the purposes of illustration only, and not to limit the scope of the invention as defined in the accompanying claims.

The invention claimed is:

1. A method of operating a wind turbine comprising a rotor with a number of pitch-adjustable rotor blades, the rotor being arranged to drive an electrical generator, the wind turbine further comprises:
   a power storage unit;
   a number of power consuming units being grouped into at least a first group of power consuming units and a second group of power consuming units, the first group of power consuming units being powered by the power storage unit; and
   a first electrical converter for connecting the electrical generator to an electrical grid; and
   a second electrical converter for connecting the electrical generator to the power storage unit;
the method comprising:
   in response to detecting an occurrence of loss of the electrical grid:
      disconnecting the first electrical converter from the electrical generator; and
      connecting the second electrical converter to the electrical generator, wherein the electrical generator is operated with a reduced rotation speed; and in response to detecting that the electrical grid has returned:
  connecting the first electrical converter to the electrical generator; and
  disconnecting the second electrical converter from the electrical generator.

2. The method according to claim 1, wherein the first group of power consuming units comprises at least one of: pitch actuators, equipment for lubrication of bearings, yaw actuators, or a control unit.

3. The method according to claim 1, wherein the second group of power consuming units are not powered during the loss of the electrical grid.

4. The method according to claim 1, wherein the power storage unit is a rechargeable power storing unit, and wherein connecting the second electrical convertor to the electrical generator is further conditioned upon detection of a voltage level of the rechargeable power storing unit is below a first voltage threshold.

5. The method according to claim 1, wherein the second electrical convertor is disconnected from the electrical generator upon detection of an output voltage level of the electrical generator is below a first output threshold and connected to the electrical generator upon detection of the output voltage level of the electrical generator is above a second output threshold, the second output threshold being larger than the first output threshold.

6. The method according claim 1, wherein during the loss of the electrical grid, a speed of the electrical generator is controlled by adjusting the pitch-adjustable rotor blades.

7. The method according to claim 6, wherein the speed is controlled to be within a speed range.

8. The method according to claim 1, wherein the pitch-adjustable rotor blades during the loss of the electrical grid are operated in a reduced mode with slower pitch angle adjustment as compared to normal mode operation.

9. The method according to claim 1, wherein the first group of power consuming units comprise a hydraulic system that comprises one or more check valves which can be selectively controlled.

10. The method according to claim 1, further comprising upon detection of a voltage level of the power storage unit being below a second voltage threshold, stopping a rotation of the rotor and entering a sleep mode.

11. The method according to claim 10, further comprising detecting a wind speed and comparing the wind speed with a wind speed threshold, upon detection of the wind speed being above a wind speed threshold, starting the rotation of the rotor and exiting the sleep mode.

12. The method according to claim 1, further comprising:
  upon detecting the occurrence of the loss of the electrical grid, stopping a rotation of the rotor;
  while a voltage level of the power storage unit is above a first voltage threshold, powering the first group of power consuming units by the power storage unit; and
  upon detecting that the voltage level of the power storage unit is below the first voltage threshold, rotating the rotor to ensure sufficient power of the power storage unit to operate the first group of power consuming units.

13. The method according to claim 1, wherein the electrical generator is operated in an idling mode of operation with a reduced rotation speed.

14. The method according to claim 1, further comprising operating controllable switches to selectively connect the first or second electrical converters to the electrical generator.

15. The method according to claim 1, wherein the second electrical converter is connected to the electrical generator at a time when a rotation of the electrical generator is reducing to stop.

16. The method according to claim 1, wherein the second electrical converter is further arranged to generate AC electrical power for powering the second group of power consuming units.

17. The method according to claim 1, wherein the second electrical converter comprises an AC boosting circuit.

18. The method according to claim 1, wherein the second electrical converter comprises a DC boosting circuit.

19. The method according to claim 1, wherein the second electrical converter comprises a rectifying circuit followed by a DC to DC boosting circuit.

20. The method according to claim 1, wherein the first electrical converter is dimensioned to handle a rated power of the wind turbine, whereas the second electrical converter is dimensioned to handle less than 10% of the rated power of the wind turbine.

21. The method according to claim 1, wherein the electrical generator is a permanent magnet electrical generator.

22. A wind turbine comprising:
  an electrical generator;
  a rotor with a number of pitch-adjustable rotor blades, the rotor being arranged to drive the electrical generator;
  a power storage unit;
  a number of power consuming units being grouped into at least a first group of power consuming units and a second group of power consuming units, the first group of power consuming units being powered by the power storage unit;
  a first electrical converter for connecting the electrical generator to an electrical grid; a second electrical converter for connecting the electrical generator to the power storage unit;
  a grid sensor for detecting an electrical state of the electrical grid;
  a data processing system configured to perform an operation, comprising:
    in response to detecting an occurrence of loss of the electrical grid:
      disconnecting the first electrical converter from the electrical generator;
      connecting the second electrical converter to the electrical generator; and
      operating the electrical generator with a reduced rotation speed; and
    in response to detecting that the electrical grid has returned:
      connecting the first electrical converter to the electrical generator; and
      disconnecting the second electrical converter from the electrical generator.

23. A non-transitory computer readable medium containing a program which, when executed by one or more processors, performs an operation for controlling a wind turbine during a grid loss, the wind turbine comprising a rotor with a number of pitch-adjustable rotor blades, the rotor being arranged to drive an electrical generator; the operation comprising:
  in response to detecting an occurrence of the grid loss:
    disconnecting a first electrical converter from the electrical generator, wherein the first electrical converter is configured for selectively connecting the electrical generator to an electrical grid; and connecting a second electrical converter to the electrical generator, upon which the electrical generator is operated with a reduced rotation speed, and wherein the second electrical converter is configured for selectively connecting the electrical generator to a power storage unit that powers a first group of power consuming units of a number of power consuming units; and in response to detecting that the electrical grid has returned:
   connecting the first electrical converter to the electrical generator; and
   disconnecting the second electrical converter from the electrical generator.

* * * * *